Jan. 1, 1935.  E. C. STEWART  1,986,650
APPARATUS FOR FEEDING MOLTEN GLASS
Filed Aug. 25, 1932  3 Sheets-Sheet 1

INVENTOR
Edward C. Stewart
By
Archworth Martin
attorney

Jan. 1, 1935.　　　　　E. C. STEWART　　　　　1,986,650
APPARATUS FOR FEEDING MOLTEN GLASS
Filed Aug. 25, 1932　　　3 Sheets-Sheet 2
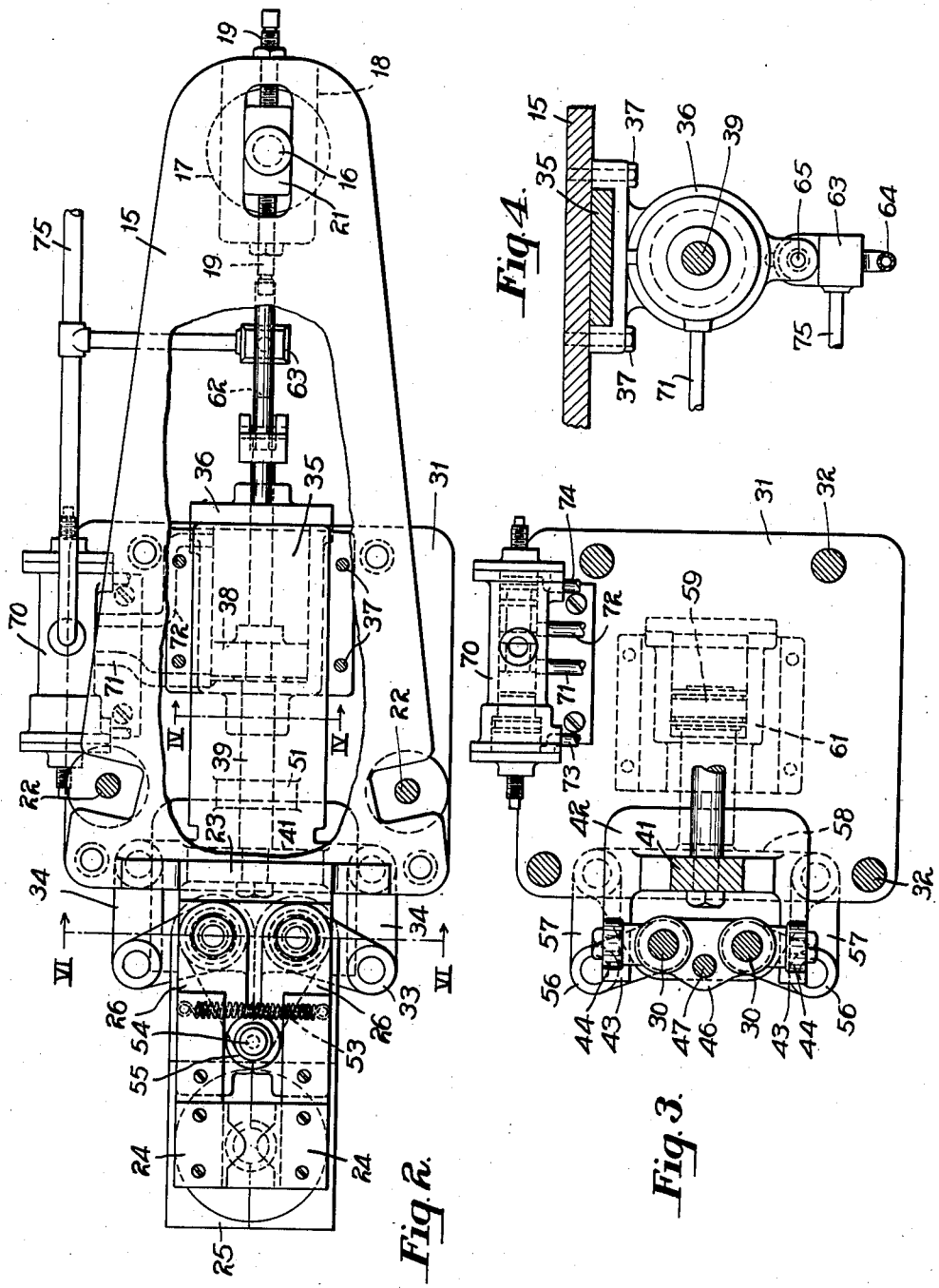
INVENTOR
Edward C. Stewart
By Archworth Martin
attorney Jan. 1, 1935.   E. C. STEWART   1,986,650
APPARATUS FOR FEEDING MOLTEN GLASS
Filed Aug. 25, 1932   3 Sheets-Sheet 3

INVENTOR
Edward C. Stewart
By
Archworth Martin
attorney

Patented Jan. 1, 1935

1,986,650

UNITED STATES PATENT OFFICE 1,986,650

APPARATUS FOR FEEDING MOLTEN GLASS

Edward C. Stewart, Washington, Pa.

Application August 25, 1932, Serial No. 630,344

7 Claims. (Cl. 49—55)

My invention relates to the separation of molten glass into mold charges and the feeding thereof to molds wherein the operation of shaping the glass is performed.

Various methods have heretofore been employed for supplying mold charges to molds, from a furnace boot or forehearth. These methods have involved the cutting of free flowing streams to form gathers or mold charges, or the forming of a suspended gob of glass at the flow ring. These methods are open to various objections. In the case of the charges formed by cutting a free flowing stream of glass, they have been accumulated in a gathering cup which is then dumped or opened to discharge the gather into a mold. During the accumulation of a charge in a cup, seams and laps would frequently occur which result in imperfections in the finished ware. Furthermore, the glass is unevenly cooled so that portions thereof are excessively cold when the charge enters the mold. In the case of the suspended gob method, difficulty is experienced in maintaining uniformity in size as between the successive gobs or mold charges. Furthermore, the shaping thereof cannot be controlled with sufficient accuracy, especially where elongated mold charges are desired for blowing articles of certain shapes.

One object of my invention is to provide a means and method whereby there is minimum contact of the mold charge with metal surfaces during its travel from the orifice of the boot to the mold.

Another object of my invention is to provide a means and a method for effecting more accurate and uniform shaping of the successive mold charges, as well as to more effectively control the volume of glass contained in each mold charge.

Another object of my invention is to provide feeding apparatus of generally simplified and improved form.

Figure 1:
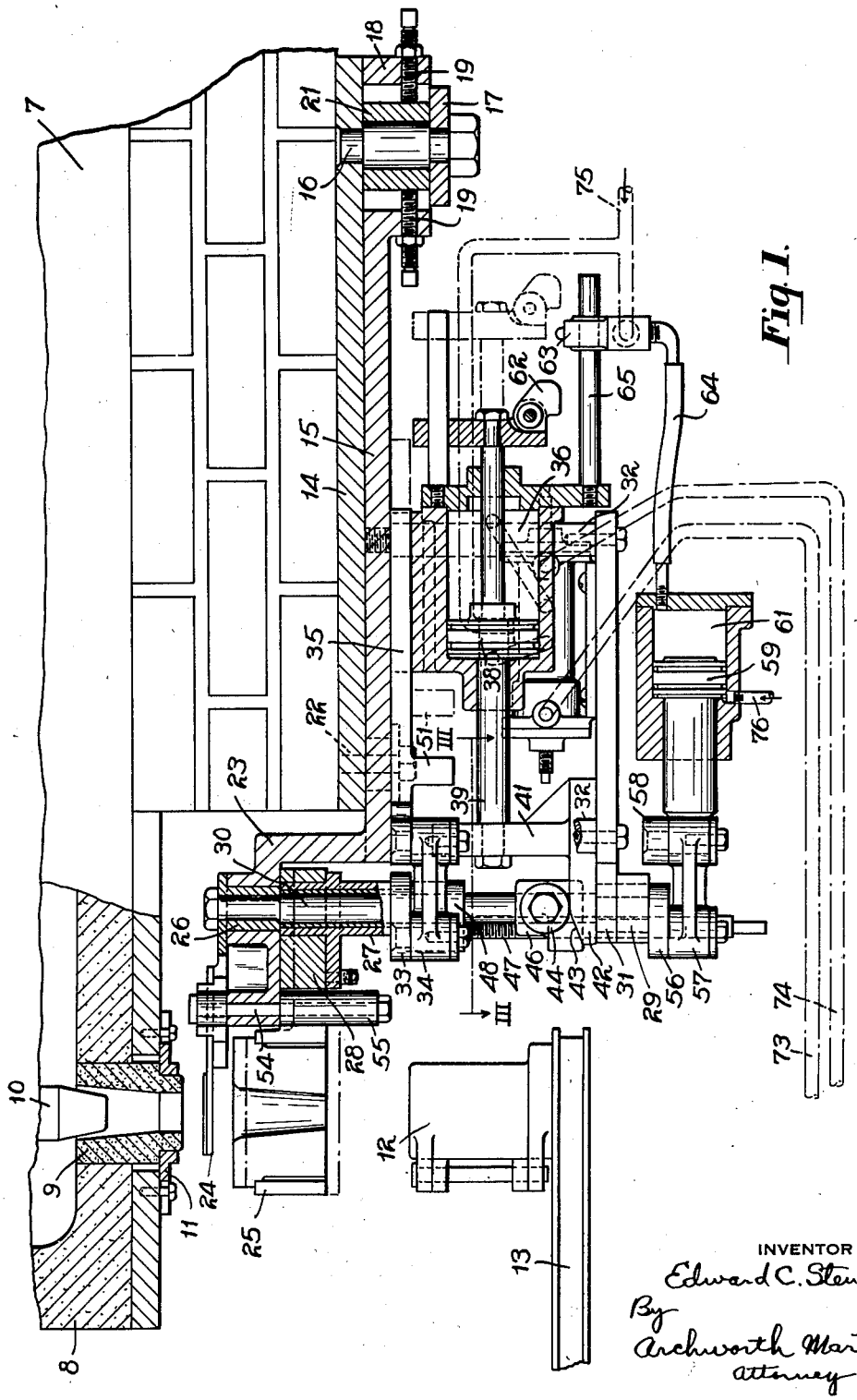
Figure 5:
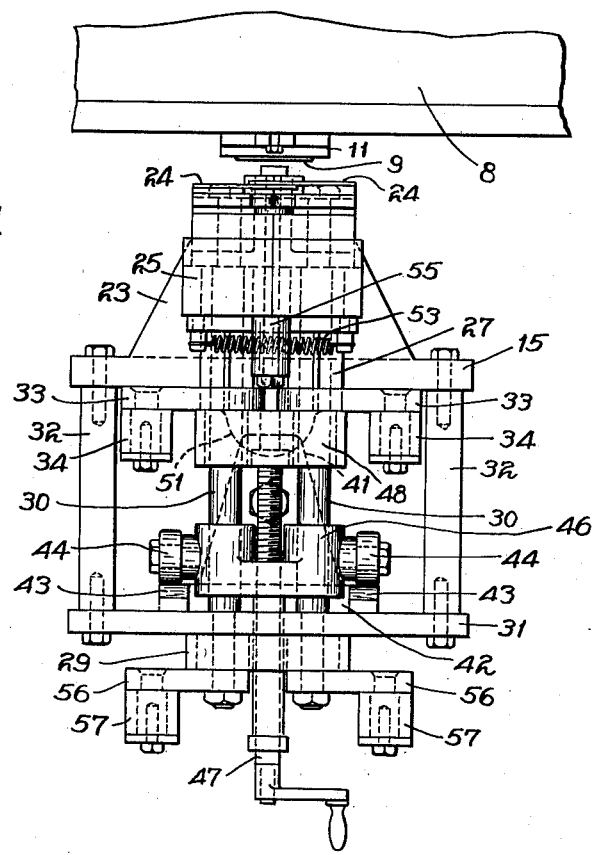
Figure 6:
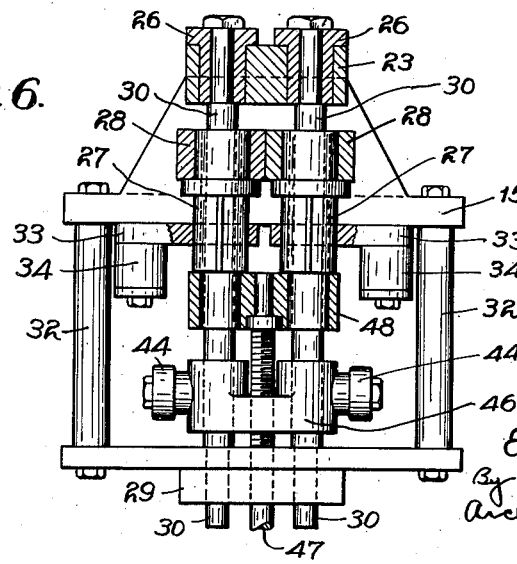

One form of apparatus by which my invention may be practiced is shown in the accompanying drawings wherein Fig. 1 is a longitudinal sectional view through a portion of the glass furnace and the feeding apparatus; Fig. 2 is a plan view of the feeding apparatus; Fig. 3 is a view taken on the line III—III of Fig. 1; Fig. 4 is a view taken on the line IV—IV of Fig. 2; Fig. 5 is a front elevational view of the apparatus; and Fig. 6 is a view taken on the line IV—IV of Fig. 2.

The furnace is represented at 7 and is provided with a boot extension 8 that has an opening which contains a flow ring 9 through which molten glass may flow when the valve member 10 is raised. The flow ring is removably supported by a metal collar 11 which is readily detachable from the boot 8 to permit replacement of the flow ring and to permit changes to flow rings of various diameters so that a stream flow of desired cross section may be had. The cross section or volume of the stream employed will of course depend upon the size and shape of the articles which it is desired to form. The plunger or valve 10 may be raised and lowered in any suitable manner and may be mounted in a stationary raised position during operation of the feeder, although I contemplate also that it may have operative connection with the moving parts of the feeder mechanism so that it may be raised and lowered in synchronism therewith in a manner well known in the art, as, for example, in the manner shown in Patent No. 1,166,576 to Bowman or in Patent No. 836,297 to Brookfield. Another form of valve may be substituted for the plunger, if desired.

The feeding apparatus is designed for supplying measured charges of glass to molds 12 that are mounted upon a mold table or carrier 13 which may be of any well-known form and which is operative in step-by-step movement so that the molds are held in stationary position a sufficient period of time to permit a mold charge to be delivered thereto.

A bottom plate 14 is secured to the underside of the furnace and a bearing or supporting plate 15 is connected thereto by means of a pin or bolt 16, a washer 17 being interposed between the head of the bolt and the collar-like extension 18 of the plate 15. Adjusting screws 19 have threaded engagement with the collar 18 and abut against a bushing 21. These screws permit the plate 15 and the feeding mechanism which is carried thereby to be adjusted longitudinally of the tank and particularly with respect to the orifice 9. The plate 15, by reason of its pivotal connection with the bolt 16, may be swung from the furnace to provide convenient access to the feeder mechanism. Normally, the forward end of the plate 15 is supported by bolts 22 that are threaded into the plate 14, these bolts of course being removed when it is desired to swing the front end of the plate 15 from beneath the furnace.

The plate 15 has a forwardly and upwardly extending bracket portion 23 that supports shears 24 and a funnel 25. The funnel is formed in half sections, each of which is pivotally supported on a vertical shaft 30, the shafts 30 being in turn supported by the bracket 23 through sleeve-like extensions on arms 26 of the shears 24. Bushings 27 surround the shafts 30 and are rigidly connected to the arms 28 of the funnel so that when the sleeves 27 are given oscillatory movement, the funnel half sections will open and close.

The lower ends of the shafts 30 are rotatably supported in bushings 29 that are carried by a lower supporting plate 31 which is hung from the upper supporting plate 15 by means of bolts 32.

Arms 33 have their inner ends slidably keyed to the bushings 27 so that rotative movement may be imparted through the arms to the bushings at various vertical positions of the bushings and the funnel sections carried thereby. The other ends of the arms 33 are connected to links 34, whose inner ends are connected to a slide plate 35. Longitudinal movement of the slide plate 35 will therefore effect oscillation of the bushings 27 on the shafts 30.

The slide plate 35, as shown more clearly in Fig. 4, is slidably supported between an air cylinder 36 and the plate 15, the air cylinder being connected to said plate 15 by bolts 37. The cylinder 36 is provided with a piston 38 having a piston rod 39, the outer end of the piston rod being connected to a bracket-like extension 41 of a cam plate 42 which is slidably supported on the lower bearing plate 31. The forward edge of the cam plate is beveled or inclined to provide camming surfaces 43 which cooperate with rollers 44 that are carried by a yoke 46 that at its ends has slidable engagement with the shafts 30. An adjusting screw 47 has threaded engagement with the yoke 46 and at its upper end is journaled in an upper yoke 48. The lower ends of the bushings 27 extend into the upper side of the yoke 48, as shown more clearly in Figs. 5 and 6. It will be seen that turning of the screw 47 will effect raising and lowering of the yoke 48 relative to the yoke 46 and consequent raising and lowering of the bushings 27 and the funnel 25 carried thereby. This adjustment permits of variation in distance between the funnel and the shears 24.

Movement of the piston 38 rearwardly results first in the lowering of the funnel 25, since such movement will draw back the cam member 42 and bring the camming surfaces 43 beneath the rollers 44, for a purpose to be hereinafter described. Further rearward movement of the piston effects engagement of the bracket extension 41 with a stop shoulder 51 that projects downwardly from the slide plate 35. Continued rearward movement of the piston draws the plate 35 backward, thereby operating the links 34 which swing the arms 33 and the bushings 27, and thus swinging the funnel sections apart to release a glass charge from the funnel.

When the piston moves forwardly out of engagement with the stop 51, the funnel sections are caused to close, by a spring 53 whose ends are connected to such sections. Further forward movement of the piston causes the cam surfaces 43 to engage the rollers 44 and raise the funnel 25 to its charge-receiving position. A centering pin 54 having a sleeve 55 is mounted in the forward end of the bracket 23 in position to be engaged by curved recesses of the funnel sections so that it serves as a centering or stop device to insure that the funnel when closed is properly aligned with respect to the flow ring 9.

The shear extensions 26 are rigidly connected to the shafts 30. To the lower ends of these shafts are secured arms 56 whose outer ends are connected to the forward ends of links 57. The links 57 are in turn connected to a cross bar 58 which is operated by means of a piston 59 contained within a cylinder 61. Reciprocation of the piston will effect oscillation of the shafts 30 and thereby operate the shear blades 24.

In operation of the device, fluid pressure is admitted alternately to opposite sides of the piston 38 to effect raising and lowering of the funnel 25 and opening movements of the funnel sections. During rearward travel of the piston 38 to open the funnel sections, a pivoted dog 62 carried thereby engages a valve 63 which admits fluid pressure through a pipe 64 to the rear side of the piston 59 and thereby effect closing or shearing movement of the shear blades.

During forward movement of the piston 38, the dog 62 has idle swinging movement when it passes the valve 63.

The valve 63 may be set at any desired position longitudinally of its supporting bar 65, so that the shears may be operated in any desired time relation with respect to movements of the funnel. As shown in the drawings, the funnel is first operated to lower it away from the lower end of a stream of molten glass that flows from the orifice 9 and the funnel sections are then swung open to more completely clear the glass. At this instant, the shears 24 are operated through engagement of the dog 62 with the valve 63. The slight lowering movement of the funnel causes it to more effectively disengage from the glass stream, particularly in view of the fact that the glass will sometimes slightly adhere to the walls of the funnel, although I propose to spray the funnel with materials such as soapy water or oil in order to reduce tendency of the glass to adhere thereto.

If the valve 63 is set farther forward on the pin 65, the shears may be caused to operate before the funnel sections are opened. In other words, fluid pressure will be admitted against the rear side of the piston 59 before the extension 41 of the cam plate 42 engages the lug 51 of the slide 35.

The sequence of operation as between the shears and the funnel opening members will depend on the extent to which an accumulation or retardation of glass is required in the funnel. When a stream of glass is of relatively large diameter, the shears may be operated before the funnel is opened, while for thinner streams, shear movement may be delayed until after accumulated flow in the funnel. Further, if the glass is of high viscosity, the cutting off of a charge may have to be delayed until there is sufficient accumulation within the cup.

A control valve 70 is provided for controlling flow of fluid pressure to the cylinder 36. Pipes 71 and 72 are connected to the front and rear sides, respectively, of the cylinder 36 and fluid pressure is admitted to these pipes alternately by the control valve 70, the control valve in turn being operated by fluid pressure from lines 73 and 74; thus fluid pressure admitted through line 73 will operate the valve 70 to admit fluid pressure to pipe 71 for the purpose of effecting retractive movement of the piston 38, while when fluid pressure is admitted through pipe 74, the valve will be operated to cause flow of fluid pressure through the pipe 72 to the rear side of the piston. The valve 70 alternately connects pipes 71 and 72 with a conduit 75 leading to a suitable source of fluid supply. Fluid pressure is admitted alternately to the pipes 73 and 74 by suitable connections with the mold table 13. Thus, when the table reaches a charge-receiving position, it will cause air to be admitted through pipe 73, while during its travel from one charge-receiving position to another charge-receiving position, it will close pipe 73 and admit pressure to pipe 74.

Fluid pressure is supplied from the conduit 75 past the valve 63 to the rear side of the piston 59 to effect closing movement of the shear blades 24. Rearward movement of the piston 59 is effected when the valve 63 is closed by fluid pressure admitted to the forward side of the piston from a pipe 76. The pipe 76 may be connected to a constant source of fluid pressure that is lower than the pressure admitted from the pipe 75 so that no control valve for the pipe 76 is necessary. The pressure from the conduit 75 being the greater, it will cause forward movement of the piston 59 against the pressure at the front side of the piston, while when the valve 63 is closed, the pressure from 76 will move the piston back. The constant pressure existing at the forward side of the piston 59 results in quick opening movement of the shears to thereby reduce tendency for the glass stream to pile thereon.

The funnel 25 serves to partially shape the mold charge, in that it retards movement of the stream and effects thickening thereof. Divided cup members may be employed instead of the funnel, but by using the funnel members, bottom chilling of the charge is reduced as compared to those cases wherein the charge is dropped into a measuring cup previous to delivery thereof to a mold. The lower end of the funnel is preferably restricted to such an extent that it will retard substantially the entire volume of a charge of glass dropped into the funnel, without any appreciable elongation through downward movement of the central portion of the glass charge during retardation of the charge.

Under many conditions, as when relatively long charges of glass are desired for the molds, there will be no appreciable retardation of falling movement within the funnel. When a charge is severed by the shears from the flowing stream before the funnel sections are opened, the funnel will serve mainly as a guide ring to restore the charge to vertical position in those cases where it has been tilted or thrust sidewise through cutting action of the shears.

From the foregoing, it will be seen that while the stream-flow from the orifice 9 may be periodically retarded somewhat by the funnel 25, the flow between the orifice and the funnel is substantially constant and that the shears always operate on what is in effect a free-flowing stream.

It will be obvious that instead of employing sections that cooperate to form a funnel, half-cup members corresponding to the funnel sections and operated in the same manner may be utilized. The cups of course exert greater retardation and actually halt the falling movement of the glass charges temporarily and exert more pronounced shaping action thereon, but they would nevertheless function as a guide to direct mold charges properly to the molds.

In the following claims, the terms "receptacle" and "retarding means" are intended to include cups as well as funnels or the like.

I claim as my invention:

1. Glass-feeding apparatus comprising a bracket adapted to be positioned adjacent to the discharge orifice of a glass furnace, a shear, a divided receptacle positioned beneath the shear and said orifice, a support for the receptacle that is vertically slidable on the bracket, means movable on the bracket for effecting vertical reciprocation of the receptacle support, means for opening the receptacle sections, and a control device for the shear, positioned in the path of movement of an actuating member therefor carried by said movable means.

2. Glass-feeding apparatus comprising a bracket adapted to be positioned adjacent to the discharge orifice of a glass furnace, a shear, a divided receptacle positioned beneath the shear and said orifice, a support for the receptacle that is vertically slidable on the bracket, means movable on the bracket for effecting vertical reciprocation of the receptacle support, means for opening the receptacle sections, and a control device for the shear, adjustably positioned in the path of movement of an actuating member therefor carried by said movable means.

3. Glass-feeding apparatus comprising a supporting bracket, means for detachably connecting said bracket to the underside of a furnace forehearth having a discharge orifice, a shear carried by the bracket, divided receptacle sections disposed below the shear, a support for the receptacle sections that is vertically slidable on the bracket, means on the bracket for effecting vertical reciprocation of the receptacle support and for opening the receptacle sections, and a device connected with said means, for effecting actuation of the shear in predetermined relation to the reciprocatory movements of the said support.

4. Glass-feeding apparatus comprising a supporting bracket, means for detachably connecting said bracket to the underside of a furnace forehearth having a discharge orifice, a shear carried by the bracket, divided receptacle sections disposed below the shear, a support for the receptacle sections that is vertically slidable on the bracket, means on the bracket for effecting vertical reciprocation of the receptacle support and for opening the receptacle sections, and a device connected with said means, for effecting actuation of the shear in predetermined relation to the reciprocatory movements of the said support, the position of said device being adjustable so that it will be caused to operate at any of certain vertical positions of the cup.

5. Glass-feeding apparatus comprising a bracket, means for detachably connecting said bracket to the underside of a furnace forehearth having a discharge orifice, a shear carried by the bracket, divided receptacle sections disposed below the shears, a support for the receptacle sections that is vertically slidable on the bracket, a horizontally-reciprocable member at the underside of the bracket for effecting vertical reciprocation of the receptacle sections, means in the path of said member for causing the receptacle sections to be opened, and a shear-operating device disposed in the path of an actuating element therefor carried by said horizontally movable member.

6. Glass-feeding apparatus comprising a bracket, means for detachably connecting said bracket to the underside of a furnace forehearth having a discharge orifice, a shear carried by the bracket, divided receptacle sections disposed below the shears, a support for the receptacle sections that is vertically slidable on the bracket, a horizontally-reciprocable member at the underside of the bracket for effecting vertical reciprocation of the receptacle sections, means in the path of said member for causing the receptacle sections to be opened, and a shear-operating device disposed in the path of an actuating element therefor carried by said horizontally-movable member the said device being adjustable along said path.

7. Glass-feeding apparatus comprising a supporting bracket, means for detachably connecting said bracket to the underside of a furnace forehearth having a discharge orifice, a shear carried by the bracket, divided receptacle sections disposed below the shears, a support for the receptacle sections that is vertically slidable on the bracket, means on the bracket for effecting vertical reciprocation of the receptacle support and for opening the receptacle sections, a rigid stop element limiting downward movement of said support, and a device connected with said means, for effecting actuation of the shear in predetermined relation to the reciprocatory movements of the said support.

EDWARD C. STEWART.